United States Patent [19]
Montemurro

[11] Patent Number: 5,189,830
[45] Date of Patent: Mar. 2, 1993

[54] TICK TRAP

[75] Inventor: Donald Montemurro, Freehold, N.J.

[73] Assignee: Janette Zuckerman, North Bergen, N.J.

[21] Appl. No.: 749,962

[22] Filed: Aug. 26, 1991

[51] Int. Cl.⁵ .......................... A01M 1/14; A01M 1/00
[52] U.S. Cl. ........................................ 43/121; 43/107; 43/114
[58] Field of Search ........................... 43/121, 107, 114

[56] References Cited

U.S. PATENT DOCUMENTS

| | | | |
|---|---|---|---|
| 4,044,495 | 8/1977 | Nishimura et al. | 43/121 |
| 4,395,842 | 8/1983 | Margulies | 43/121 |
| 4,506,473 | 3/1985 | Waters, Jr. | 43/107 |
| 4,694,604 | 9/1987 | Mitchell | 43/114 |
| 4,747,230 | 5/1988 | Zalesky | 43/121 |
| 4,815,231 | 3/1989 | McQueen | 43/121 |

OTHER PUBLICATIONS

R. H. Wright, Why Mosquito Repellents Repel, *Scientific American*, vol. 233, Jul. 1975 pp. 104-111.

Primary Examiner—Kurt C. Rowan
Attorney, Agent, or Firm—Richard A. Joel

[57] ABSTRACT

A tick trap comprises a raised base having inclined walls at each end, an upper portion having sticky tick trapping surface and an upwardly extending box-like portion having a plurality of holes around the lower surface thereof, a rectangular rain guard extending outwardly from the box at a spaced distance from the surface of the base and a hinged lid over the open end of the box. The box includes a carbon dioxide cannister which is periodically activated by batteries to emit $CO_2$ from the portholes about the box to attract ticks onto the sticky surface where they are destroyed.

5 Claims, 1 Drawing Sheet

U.S. Patent  Mar. 2, 1993  5,189,830

TICK TRAP

SUMMARY OF THE INVENTION

This invention relates to a tick trap comprising a raised base having walls and an upper surface having a sticky adhesive surface mounted thereon. An upwardly extending box-like member is mounted centrally on the upper surface of the base. The box-like member includes a plurality of portholes positioned at spaced intervals about the lower surface of said member. A carbon dioxide spray is emitted from the portholes at intervals to attract ticks onto the sticky surface.

The trap also includes a rain guard extending outwardly at right angles to the box-like structure and substantially parallel to the base to protect and to prevent flooding of the base surface. A hinged lid covers the box to permit access to the internal portion of the box which contains a carbon dioxide cylinder and means to periodically actuate the cylinder to emit a spray at predetermined intervals.

Accordingly an object of this invention is to provide a new and improved tick trap.

Another object of this invention is to provide a new, useful and unobvious insect trap utilizing a carbon dioxide spray as bait.

A more specific object of this invention is to provide a unique tick trap which utilizes carbon dioxide to lure ticks onto a sticky adhesive surface of a trap in an inexpensive efficient arrangement.

BRIEF DESCRIPTION OF THE DRAWINGS

The above and other objects and advantages of the present invention may be more clearly seen wherein.

BACKGROUND OF THE INVENTION

This invention relates to insect traps and more particularly a tick trap for destroying disease carrying ticks.

In recent years, there has been an upsurge in cases of Lyme disease carried by deer ticks. Ticks are also carriers of diseases such as Rocky Mountain Spotted fever, anaplasmosis, Q fever, hemorrhagic fever, and encephalitis. One attempted solution is to spray various poisons to kill the ticks. Spraying poisons, however, has an adverse effect on the environment and is potentially dangerous to humans.

The present invention provides a unique apparatus or tick trap for attracting and destroying ticks. The ticks are lured onto a sticky fly paper-like surface which ensnares the ticks. The ticks are then destroyed. The tick trap of the present invention is inexpensive, effective and ecologically sound. While the invention is primarily intended for trapping ticks, other insects may be trapped as well.

One primary use of the tick trap is to protect a household from dangerous ticks. The trap would be placed in a house or in the yard near the house to prevent ticks from attaching themselves to human. In other words, contrary to sprays, the trap provided a secure environment which functions continuously at predetermined intervals.

DETAILED DESCRIPTION OF THE INVENTION

Figure 1:
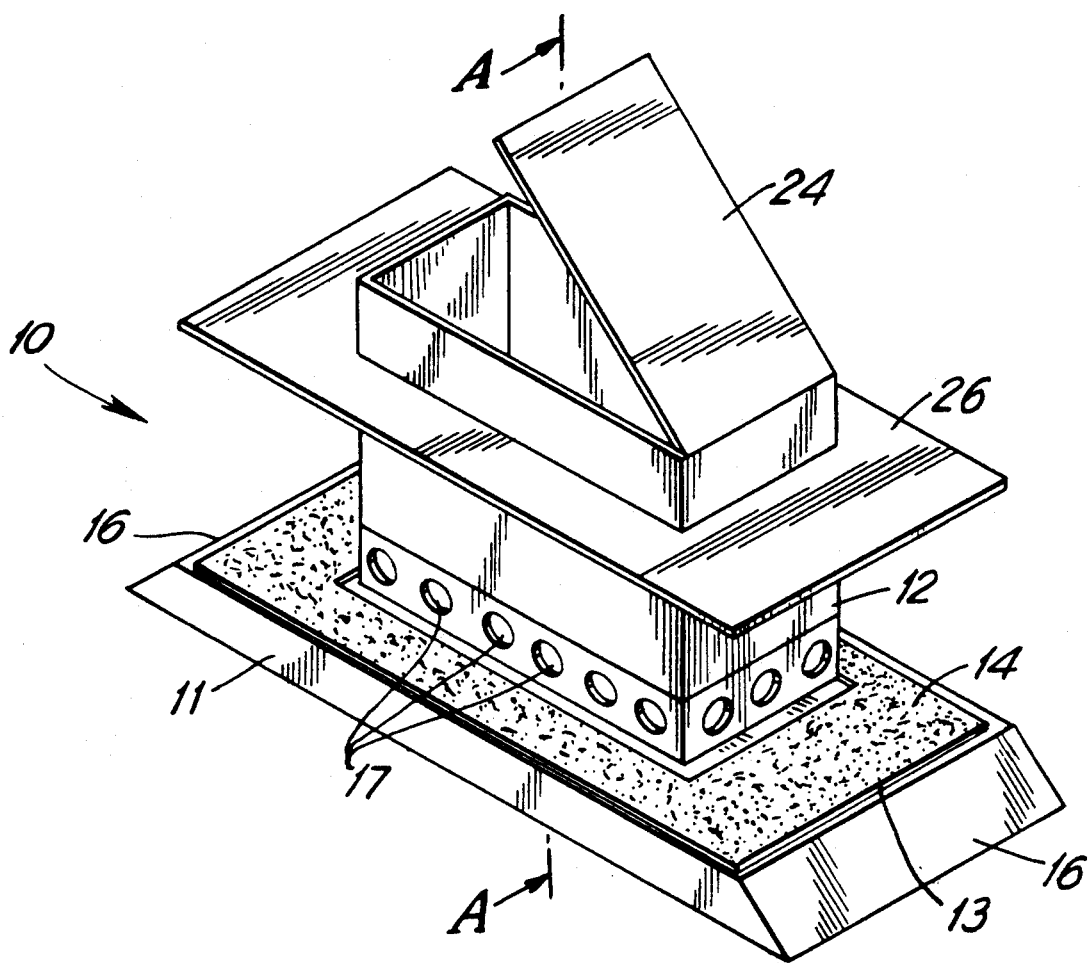
FIG. 1 is a perspective view of the tick trap comprising the present invention.
Figure 2:
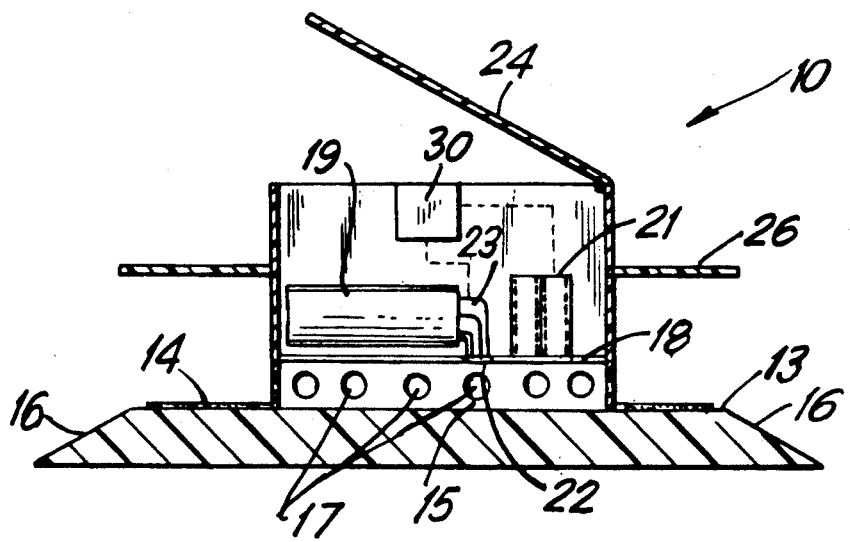
FIG. 2 is a view taken along the line A—A of FIG. 1.

Referring now to FIG. 1 of the drawings, the invention comprises a tick trap 10 which includes a raised molded plastic base 11 and a hollow box-like member 12 extending upwardly from the top surface 13 of the base 11. The trap 10 is designed to ensnare insects such as ticks on the surface 13 of the base 11 which contains a layer 14 of a sticky substance akin to fly-paper.

The base 11 of molded plastic includes at least 2 inclined walls 16 to facilitate the movement of ticks onto the entrapping layer 14. Additional apertures can be made in the inclined walls which would further attract ticks onto the surface. The box-like member 12 is centrally positioned on the rectangular base surface 14 and extends upwardly therefrom. A plurality of spaced portholes 17 extend at spaced intervals about the member 12. The portholes 17 are connected to cooper tubing 15 which is coupled to an outlet pipe on the carbon dioxide cannister 19 in a manifold arrangements (not shown).

Mounted within the member 12 is a lower transverse member or floor 18 extending across parallel to the surface 13 and at a predetermined distance therefrom.

A carbon dioxide cannister 19 and a battery power supply 21 are mounted on the floor 18. A valve 22 from the cannister is connected to a downwardly extending outlet 23 to periodically release carbon dioxide through the portholes 17. The release of carbon dioxide (humans emit carbon dioxide) is designed to attract ticks onto the surface 13 where they are trapped by the sticky layer 14 which may be impregnated with a pesticide. The ticks which become stuck on the layer 14 may be destroyed by disposing of the layer 14 or leaving the ticks on the layer 14 indefinitly.

In operation, the trap 10 would be placed in tick infested area. The carbon dioxide cannister 19 is positioned in member 12 through the hinged lid 24 and activated from the battery power supply 21 to periodically release gas through the portholes 17. Ticks are attracted by the gas and land on the sticky layer 14 where they become firmly embedded. The dispensing valve 19 on the cannister 15, is connected to the batteries 22 through a small timed RC circuit (not shown). To protect the surface 14, a rain guard 26 comprising a rectangular member is mounted transversely to member 12 to prevent the surface 13 from being flooded or covered with debris. The invention as thus described is rather inexpensive, flexible, and effective.

While the invention has been explained by a detailed description of certain specific embodiments, it is understood that various modifications and substitutions can be made in any of them within the scope of the appended claims which are intended also to include equivalents of such embodiments.

What is claimed is:

1. A tick trap comprising:

a base having an upper surface with a sticky layer thereon;

a hollow member mounted on the base and extending upwardly therefrom, said member having a plurality of portholes located at spaced intervals about the lower portion of the hollow member adjacent the upper surface of the base and comprising a box like structure having a floor extending thereacross at a distance above the base, and, a pressurized gas tank and means to actuate said tank mounted on said floor comprising a timing circuit, a battery power supply coupled thereto and actuating means connected to said tank and to the power supply and periodically activated by the timing circuit, wherein the gas tank releases a gas through the portholes when actuated which attracts ticks, said ticks becoming embedded in the sticky layer.

2. A tick trap in accordance with claim 1 wherein:
the base comprises a lower surface; upwardly extending walls at least one of said walls being inclined inwardly from the lower surface to facilitate tick movement onto the upper surface and an upper surface having a removable sticky layer thereon.

3. A tick trap in accordance with claim 1 wherein:
the hollow member comprises a box-like structure having a floor extending thereacross at a distance above the base surface wherein the gas canister is mounted thereon and wherein the means to actuate said cannister comprises a timing circuit and a battery power supply coupled to said cannister.

4. A tick trap in accordance with claim 1 wherein:
the gas tank comprises a pressurized carbon dioxide cannister having outlet means extending through the floor to release the tick enticing carbon dioxide gas through the portholes.

5. A tick trap in accordance with claim 3 further including
a transverse protective member mounted to the hollow member at a predetermined distance above the upper base surface and extending outwardly therefrom to shield the sticky layer, and
a lid mounted over the top of the hollow member and hinged thereto at one end.

* * * * *